US009541381B2

(12) United States Patent
Colonna de Lega

(10) Patent No.: US 9,541,381 B2
(45) Date of Patent: Jan. 10, 2017

(54) SURFACE TOPOGRAPHY INTERFEROMETER WITH SURFACE COLOR

(71) Applicant: Zygo Corporation, Middlefield, CT (US)

(72) Inventor: Xavier Colonna de Lega, Middlefield, CT (US)

(73) Assignee: Zygo Corporation, Middlefield, CT (US)

( * ) Notice: Subject to any disclaimer, the term of this patent is extended or adjusted under 35 U.S.C. 154(b) by 264 days.

(21) Appl. No.: 14/174,352

(22) Filed: Feb. 6, 2014

(65) Prior Publication Data
US 2014/0226150 A1    Aug. 14, 2014

Related U.S. Application Data

(60) Provisional application No. 61/763,911, filed on Feb. 12, 2013.

(51) Int. Cl.
*G01B 11/02* (2006.01)
*G01B 11/24* (2006.01)
(Continued)

(52) U.S. Cl.
CPC ......... *G01B 11/2441* (2013.01); *G01B 9/0203* (2013.01); *G01B 9/02007* (2013.01);
(Continued)

(58) Field of Classification Search
CPC ............. G01B 11/2441; G01B 9/02007; G01B 9/02083; G01B 9/0209; G01B 9/02091; G01J 3/0229; G01J 3/501; G01J 3/51; G01J 3/10; G01J 2003/102; G01J 2003/106; G01N 2021/3133; G01N 2021/3174; A61B 3/102; A61B 5/0066; A61B 5/0073
(Continued)

(56) References Cited

U.S. PATENT DOCUMENTS 5,398,113 A    3/1995  de Groot
7,095,503 B2 *  8/2006  Kim ..................... A61B 5/0066
                                                        356/497

(Continued)

FOREIGN PATENT DOCUMENTS

CH           EP 1892501 A2 *  2/2008  ......... G01N 21/4795
KR     10 2012 0027702          3/2012  ............... G01B 9/02
(Continued)

OTHER PUBLICATIONS

International Search Report and the Written Opinion of the International Searching Authority for International Application No. PCT/US2014/015078 dated Nov. 20, 2014 (9 pages).
(Continued)

*Primary Examiner* — Tarifur Chowdhury
*Assistant Examiner* — Jonathon Cook
(74) *Attorney, Agent, or Firm* — Fish & Richardson P.C.

(57) ABSTRACT

Systems and methods for generating 3D representations of shape and color texture of a test surface are described. In one aspect, surface topography interferometers are equipped with a multi-element detector and an illumination system to produce a true-color image of the measured object surface. Color information can be presented as a true-color two-dimensional image or combined with topography information to form a three-dimensional representation of the shape and color texture of the object, effectively creating for a human observer the impression of looking at the actual part.

35 Claims, 9 Drawing Sheets
(7 of 9 Drawing Sheet(s) Filed in Color)

(51) Int. Cl.
*G01B 9/02* (2006.01)
*G01J 3/50* (2006.01)
*G01J 3/02* (2006.01)

(52) U.S. Cl.
CPC ....... *G01B 9/0209* (2013.01); *G01B 9/02087* (2013.01); *G01J 3/0229* (2013.01); *G01J 3/501* (2013.01)

(58) Field of Classification Search
USPC ......... 356/511, 73, 425, 416, 418, 420, 479, 356/497
See application file for complete search history.

(56) References Cited

U.S. PATENT DOCUMENTS

| | | | |
|---|---|---|---|
| 7,324,214 | B2 | 1/2008 | de Groot et al. |
| 7,978,346 | B1 | 7/2011 | Riza |
| 2004/0075842 | A1 | 4/2004 | Dunn et al. |
| 2005/0185192 | A1 | 8/2005 | Kim et al. |
| 2008/0049234 | A1 | 2/2008 | Seitz |
| 2009/0182528 | A1 | 7/2009 | de Groot et al. |
| 2010/0128276 | A1 | 5/2010 | de Groot et al. |
| 2011/0292402 | A1 | 12/2011 | Awatsuji et al. |
| 2012/0033227 | A1* | 2/2012 | Bower ............... A61B 3/102 356/479 |
| 2012/0140243 | A1 | 6/2012 | Colonna de Lega |

FOREIGN PATENT DOCUMENTS

| | | | |
|---|---|---|---|
| TW | 2009/40948 | 10/2009 | ............ G01B 11/30 |
| TW | 2011/29775 | 9/2011 | ............... G01B 9/02 |
| WO | WO 03/033994 | 4/2003 | ............... G01B 9/02 |

OTHER PUBLICATIONS

International Preliminary Report on Patentability and Written Opinion for International Application No. PCT/US2014/015078 dated Aug. 27, 2015 (6 pages).

Robles, et al., "Molecular imaging true-colour spectroscopic optical coherence tomography," *Nature Photonics*, vol. 5, pp. 744-747 (2011), DOI: 10.1038/NPHOTON.2011.257.

Tominaga et al., "Spectral imaging by synchronizing capture and illumination," *J. Opt. Soc. Am. A* vol. 29, No. 9, pp. 1764-1775 (Sep. 2012).

Yang et al., "Full-color skin imaging using RGB LED and floating lens in optical coherence tomography," *Biomedical Optics Express* vol. 1, No. 5, pp. 1341-1346 (Dec. 1, 2010).

The Supplementary European Search Report for European Application No. EP 14 75 1290 dated Sep. 6, 2016.

European Patent Office Communication for European Application No. 14 751 290.9 dated Nov. 2, 2016 (8 pages).

\* cited by examiner

# SURFACE TOPOGRAPHY INTERFEROMETER WITH SURFACE COLOR

CROSS-REFERENCE TO RELATED APPLICATIONS

This application claims benefit of the Provisional Application No. 61/763,911, entitled "SURFACE TOPOGRAPHY INTERFEROMETER WITH SURFACE COLOR," filed on Feb. 12, 2013. The entire content of this priority application is hereby incorporated by reference.

BACKGROUND

This specification describes interferometric surface profilers used to generate 3D topography maps of measured surfaces with overlaid color texture information.

Interferometric optical techniques are widely used to measure optical thickness, surface shape (or topography), and other geometric and refractive index properties of precision optical components such as glass substrates used in lithographic photomasks, optical lenses, air bearing surfaces of magnetic head sliders, etc.

For example, one can use an interferometer to combine a test beam reflected from a test surface with a reference beam reflected from a reference surface to form an optical interference pattern (also referred to as a fringe pattern). Spatial variations (e.g., dark and bright fringes) in the intensity profile of the optical interference pattern correspond to phase differences between the combined wave fronts of the test and reference beams caused by, for example, variations in the profile of the test surface relative to the reference surface.

SUMMARY

This specification describes embodiments of surface topography interferometers equipped with a multi-element detector (e.g., a monochrome CMOS or CCD camera) and an illumination system to produce a true-color image of the measured object surface. In this specification, the term "true-color" is used for a rendition of an object's natural colors through an image. The color information may be presented as the true-color two-dimensional image or combined with the topography information to form a three-dimensional (3D) representation of the shape and color texture of the object, effectively creating for a human observer the impression of looking at the actual part.

In general, one innovative aspect of the subject matter described in this specification can be embodied in an interferometry system that includes an illumination module configured to generate multiple different spectral light distributions; a multi-element detector; an imaging module configured to image, on the multi-element detector, a surface of a test object using test light, and to combine the test light, on the multi-element detector, with reference light to form an interference pattern, where the test and reference light are derived from the illumination module; and an electronic control module communicatively coupled with at least the illumination module and the multi-element detector. During operation, the electronic control module causes the illumination module to sequentially illuminate the surface of the test object with the multiple different spectral light distributions while the multi-element detector correspondingly records interference patterns and images of the surface of the test object. Further during operation, the electronic control module determines information about (i) a shape of the surface of the test object, at least in part, from the interference patterns recorded for one or more of the multiple different spectral light distributions, and (ii) a color of the surface of the test object, at least in part, from images recorded for two or more of the multiple spectral distributions. Additionally during operation, the electronic control module generates a representation of the shape and the color of the surface of the test object from the determined information.

These and other embodiments may each optionally include none, one or more of the following features. In some implementations, the one or more of the multiple spectral light distributions used to form the recorded interference patterns is a first spectral light distribution, and the respective two or more of the multiple spectral distributions used for the recorded images are the first spectral light distribution and a second spectral light distribution. In some implementations, the one or more of the multiple spectral light distributions used to form the recorded interference patterns is a first spectral light distribution, and the respective two or more of the multiple spectral distributions used for the recorded images are a second spectral light distribution and a third spectral light distribution.

In some implementations, the one or more of the multiple spectral light distributions used to form the recorded interference patterns is a broadband light distribution, and the respective two or more of the multiple spectral distributions used for the recorded images are two or more from among red, green or blue light distributions. For example, the illumination module can include a white light source that emits the broadband light distribution, and two or more of a red filter, a green filter or a blue filter. In this case, the red, green, and blue filters are configured to filter the broadband light distribution provided by the white light source to respectively obtain the red, green and blue light distributions. As another example, the illumination module can include a white light source that emits the broadband light distribution, and two or more of a red light source, a green light source or a blue light source that respectively emit the red, green and blue light distributions.

In some implementations, the electronic control module switches, at a frame rate of the multi-element detector or an integral fraction thereof, the illumination module between the one or more of the multiple spectral light distributions used to form the interference patterns and the two or more of the multiple spectral light distributions used for recording the images. In some implementations, the electronic control module maintains the one or more of the multiple spectral light distributions when the interference patterns are recorded by the multi-element detector, and switches, at a frame rate of the multi-element detector or an integral fraction thereof, the two or more of the multiple spectral light distributions when the images used for color information are recorded by the multi-element detector.

In some implementations, the interferometry system can include a stage positioned to vary an optical path length difference between the test light and the reference light, and an actuator communicatively coupled with the electronic control module and configured to shift the stage to positions corresponding to multiple optical path length differences between the test and reference lights. Each of the optical path length differences forms an associated interference pattern from among the interference patterns. In this case, the stage is arranged to position the test object surface relative to the imaging module. Moreover, the electronic control module positions the test object surface within a depth of focus of the imaging module, based on the determined information about the shape of the surface of the test object, such that the images are recorded in focus by the multi-element detector.

In some implementations, the interferometry system can include a wavelength tunable light source (e.g., a laser diode) configured to emit test light of two or more wavelengths, and a second light source (e.g., a color LED) configured to emit illumination light having a spectral light distribution different from the two or more wavelengths of the test light. In this case, the respective two or more of the multiple spectral distributions used for the recorded images are one of the two or more wavelengths of the light emitted by the wavelength tunable light source, and the spectral light distribution of the illumination light emitted by the second light source. Further in this case, the imaging module defines a non-zero optical path length difference between the test light and the reference light. Moreover, the electronic control module shifts between the two or more wavelengths of the test light corresponding to two or more phase differences between the test and reference lights. Each of the phase differences forms an associated interference pattern from among the interference patterns.

In some implementations, the information about the color of the surface of the test object is determined by the electronic control module as a true-color image, such that each pixel of the true-color image comprises an average of corresponding pixels of the images of the surface of the test object respectively illuminated with the two or more of the multiple spectral distributions. For example, fringes of interference patterns in the images of the surface of the test object illuminated with respective two or more of the multiple spectral distributions are removed by the electronic control module prior to generation of the average associated with the true-color image. As another example, the imaging module includes an interferometer module that is bypassed during acquisition of the images of the surface of the test object respectively illuminated with two or more of the multiple spectral distributions, such that the images are free of interference patterns.

In some implementations, the illumination module and the imaging module include respective beam stops with matching apertures configured and arranged to allow only non-specularly reflected light to reach the multi-element detector. Moreover, the electronic control module disengages the beam stops when the multi-element detector records the interference patterns, and engages the beam stops when the multi-element detector obtains the images of the surface of the test object respectively illuminated with two or more of the multiple spectral distributions. In some implementations, the illumination module is configured and arranged to provide the respective two or more of the multiple spectral distributions used for the recorded images at angles of incidence with respect to the surface of the test object, such that only non-specularly reflected light enters the imaging module.

In some implementations, the interferometry system further includes a display device. In this case, the electronic control module, prior to recording the interference patterns of the surface of the test object, causes the illumination module to sequentially illuminate the surface of the test object with the two or more spectral light distributions while the multi-element detector correspondingly records images of the surface of the test object. Further in this case, the electronic control module determines information about the color of the surface of the test object, at least in part, from the images recorded for the two or more of the multiple spectral distributions, and renders, in real time on the display device based on the determined information about the color of the surface of the test object, a sequence of true color images of the surface of the test object. In response to rendering the sequence of true color images, the electronic control module receives a specification of a measurement site, located within the sequence of the true color images, at which the representation of the shape and the color of the surface of the test object is to be generated.

Another innovative aspect of the subject matter described in this specification can be embodied in an interferometry method that includes imaging, by imaging optics on a multi-element detector, a surface of a test object using test light, and combining, by the imaging optics on the multi-element detector, the test light with reference light to form an interference pattern. The test and reference light are derived from a light source that emits multiple different spectral light distributions. The method further includes sequentially illuminating the surface of the test object with the multiple different spectral light distributions while correspondingly recording, by the multi-element detector, interference patterns and images of the surface of the test object. Furthermore, the method includes determining, by a controller module, information about (i) a shape of the surface of the test object, at least in part, from the interference patterns recorded for one or more of the multiple different spectral light distributions, and (ii) a color of the surface of the test object, at least in part, from images recorded for two or more of the multiple spectral distributions. Additionally, the method includes generating, by the controller module, a representation of the shape and the color of the surface of the test object from the determined information.

These and other embodiments may each optionally include none, one or more of the following features. In some implementations, the one or more of the multiple spectral light distributions used to form the recorded interference patterns is a first spectral light distribution, and the respective two or more of the multiple spectral distributions used for the recorded images are the first spectral light distribution and a second spectral light distribution.

In some implementations, the one or more of the multiple spectral light distributions used to form the recorded interference patterns can be a first spectral light distribution, and the respective two or more of the multiple spectral distributions used for the recorded images can be a second spectral light distribution and a third spectral light distribution. For example, the method can include switching, at a frame rate of the multi-element detector or an integral fraction thereof, the light source between the one or more of the multiple spectral light distributions used to form the interference patterns and the two or more of the multiple spectral light distributions used for recording the images. As another example, the method can include maintaining the one or more of the multiple spectral light distributions when the interference patterns are recorded by the multi-element detector, and switching, at a frame rate of the multi-element detector or an integral fraction thereof, the two or more of the multiple spectral light distributions when the images used for color information are recorded by the multi-element detector. Further, the method can include varying an optical path length difference between the test light and the reference light by positioning a stage, and shifting, by an actuator, the stage to positions corresponding to multiple optical path length differences between the test and reference images, such that each of the optical path length differences forms an associated interference pattern. Furthermore, the method can include positioning the test object surface relative to the imaging optics by arranging the stage. Additionally, the method can include positioning, by the control module, the test object surface within a depth of focus of the imaging optics, based on the determined information about the shape of the surface of the test object, such that the images are recorded in focus by the multi-element detector.

In some implementations, the operation of determining the information about the color of the surface of the test object can include generating a true-color image, such that each pixel of the true-color image comprises an average of corresponding pixels of the images of the surface of the test object respectively illuminated with the two or more of the multiple spectral distributions. For example, the method can include removing fringes of interference patterns in the images of the surface of the test object respectively illuminated with two or more of the multiple spectral distributions prior to generating the average associated with the true-color image. As another example, the method can include bypassing reference leg of the imaging optics during acquisition of the images of the surface of the test object respectively illuminated with two or more of the multiple spectral distributions, such that the images are free of interference patterns.

In some implementations, the method can include engaging, by the controller module, matching beam stops respectively disposed in the light source and the imaging optics to allow only non-specularly reflected light to reach the multi-element detector, when the multi-element detector obtains the images of the surface of the test object respectively illuminated with two or more of the multiple spectral distributions, and disengaging, by the controller module, the matching beam stops when the multi-element detector records the interference patterns.

In some implementations, the method can include providing, by the light source, the two or more of the multiple spectral distributions, used to respectively form the images, at angles of incidence with respect to the surface of the test object, such that only non-specularly reflected light enters the imaging optics.

Embodiments can be implemented so as to realize one or more of the following advantages. The interferometry systems can be used to provide metrological or quantitative information about objects, including form, roughness, texture, material properties, etc. Additionally, the disclosed technologies provide color information about the sample surface. Color information is useful for a number of applications such as, for example, identification of the location on the sample surface of distinct materials, film structures (e.g., structures of films within semiconductor devices and/or LCD displays), corroded, stained, anodized or annealed areas on machined metal parts, inks, and/or markings. The location information can be used for two-dimensional metrology (e.g., registration, critical dimensions), part alignment to the profiler, and/or defect detection and characterization. The color information may be used to generate life-like or true-color computer representation of a sample surface for qualitative visual inspection, manual sorting or classification.

Moreover, the disclosed technologies can be used to capture true-color information about a sample surface without limiting in any way the metrology capability of the profiler. For instance, the lateral and vertical resolution of the interferometry system described in this specification is similar to that of a conventional profiler using the same interferometer configuration (magnification, numerical aperture and spatial sampling), when performing surface metrology. In addition, in embodiments, the acquisition of the metrology data is not burdened by the requirements of color data acquisition. For example, the interferometry system may use various apertures or field stops, spectral filters, and so on, which are optimum for collecting 3D topography.

The interferometry systems generally use a multi-function light source that provides a spectrum for metrology as well as the one or more spectra for collecting color information without requiring changes of a conventional multi-element detector. This is a key benefit of the disclosed technologies as performance of the multi-element detector (e.g., linearity, full-well depth, sensing element dimensions, quantum efficiency, readout noise, etc.) is an important element in the metrology chain. Having to compromise the detector performance to accommodate the additional color imaging may, in general, degrade the performance of the instrument. For instance, using a color sensitive camera instead of a monochrome camera may result either in a loss of lateral resolution (e.g., single detector with color filter matrix) or sharp increase in system costs (e.g., multiple detectors as in multi-CCD imagers) and reduction in commercially available devices.

The details of one or more embodiments are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 3 is presented in color.

FIG. 4 is presented in color.

FIG. 5 is presented in color.

FIGS. 6A-6B are presented in color.

FIG. 8 is presented in color.

FIG. 9 is presented in color.

FIG. 10 is presented in color.

FIG. 11 is presented in color.

Like reference numbers and designations in the various drawings indicate like elements.

DETAILED DESCRIPTION

Figure 1:
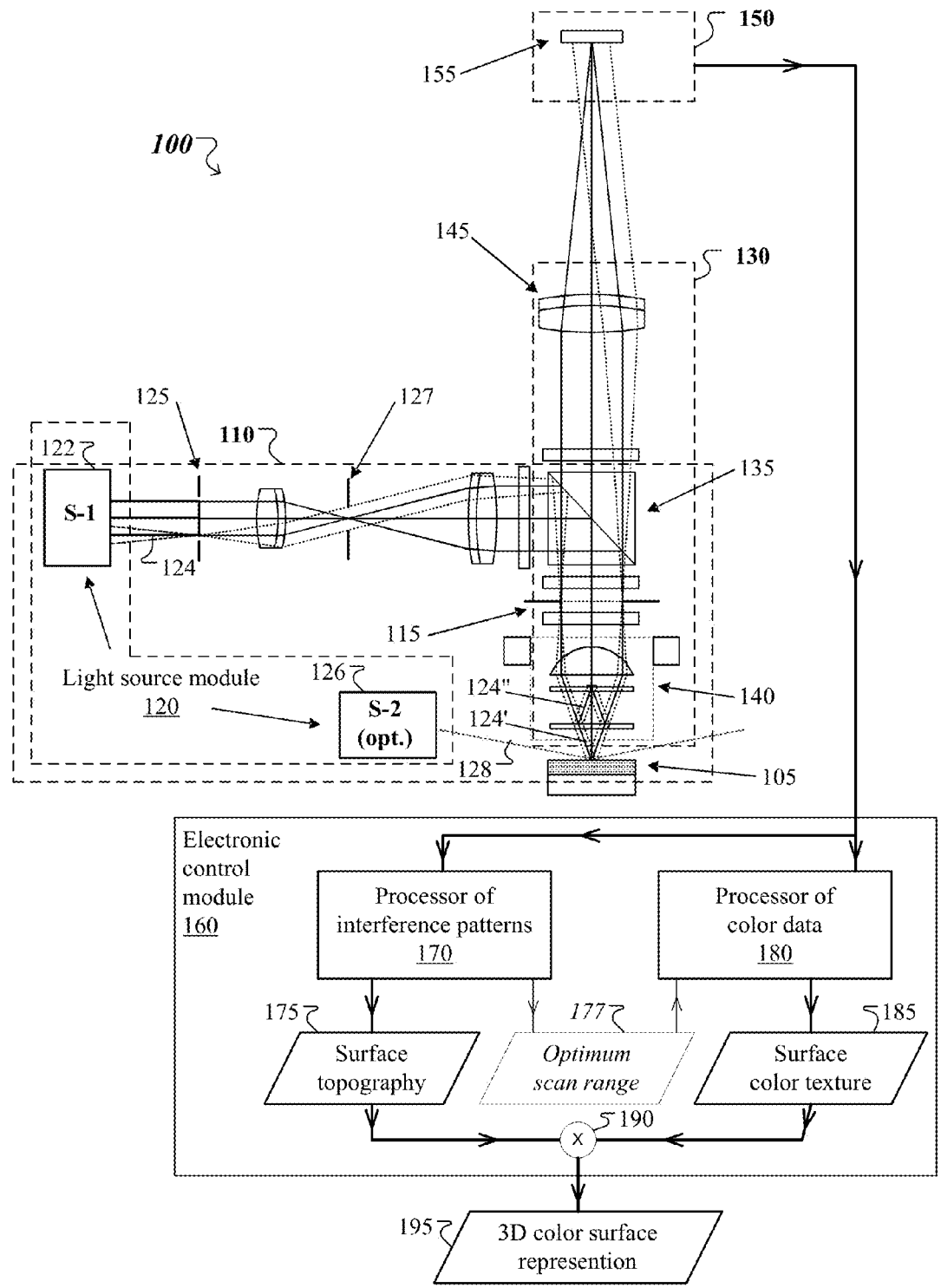
FIG. 1 is schematic diagram of an example of an interferometry system used to determine surface topography and color texture of a test object.

FIG. 1 is schematic diagram of an example of an interferometry system 100 used to generate a 3D representation of shape and color texture 195 of a surface of a test object 105. In some implementations, the interferometry system 100 is a low-coherence interference surface profiler. The interferometry system 100 includes an illumination module 110, an imaging module 130, an image acquisition module 150, and an electronic control module 160. The test object 105 is placed on a mount.

The illumination module 110 includes a light source module 120 and is configured to illuminate a surface of the test object 105. The light source module 120 generates more than one spectral distribution of light in the course of a complete measurement. In some implementations, the light source module 120 includes a first light source sub-module 122 arranged and configured to provide illumination light 124 for acquiring surface topography data, and a second light source sub-module 126 arranged and configured to provide illumination light 128 for acquiring surface color data. In this case, the illumination light 128 can be modulated between multiple different spectral light distributions, as described in detail below in connection with FIG. 11. In other implementations, the light source module 120 includes a single light source sub-module 122 arranged and configured to provide illumination light 124 for acquiring surface topography data and surface color data. In this case, the illumination light 124 can include multiple different spectral light distributions, as described in detail below in connection with FIGS. 2 and 10. In both implementations, the multiple spectral light distributions generated by the light source module 120 are modulated based on various sequences as described below in connection with FIGS. 4 and 5.

The light 124 can be delivered to the surface of the test object 105 through dedicated illumination optics of the illumination module 110. The illumination optics include adjustable apertures, e.g., apertures 125, 127, a field stop 115, and an interference objective 140. The interference objective 140 is configured to split the light 124 into test light 124' and reference light 124". The test light 124' is reflected or scattered by the test object surface and then it is collected by the imaging module 130. The reference light 124" is diverted away from the test object 105 and reflects off a reference surface of the interference objective 140 before being collected by the imaging module 130. The interference objective 140 combines the test light 124' with the reference light 124", and then a relay optic 145 of the imaging module 130 forms a final image of the test object surface onto a multi-element 2D detector 155 of the image acquisition module 150.

In this manner, the imaging module 130 is configured such that the test light 124' and the reference light 124" interfere at the multi-element detector 155 and form interference patterns associated with the test object surface, at least for some fraction of the data collection process performed during a measurement. In this case, both the test and reference light 124', 124", are derived from one of the multiple different spectral light distribution. In general, interferometric profiling relies on the presence of such interference phenomena to extract metrology information (e.g., topography or surface shape information). Because the shape, contrast and extent of the interference patterns depend to a large extent on a spectral distribution of the light source module 122 of the interferometry system 100, the light source module 122 includes a source that has been optimized to provide the best compromise of vertical and lateral resolution, measurement throughput, etc. Such optimizations frequently result in spectral distributions that would be non-optimum if a conventional surface profiler was also tasked with collecting color information about the test object surface. As such, the imaging module 130 is configured to form on the multi-element detector 155, in addition to the above noted interference patterns, images of the surface of the object respectively illuminated with two or more of the multiple spectral distributions. These images represent color data associated with the test object surface. In this manner, topography information is acquired with a source spectrum and signal sampling configuration that is optimum for surface height metrology while color information is acquired with source spectra optimum for color rendering.

The electronic control module 160 is communicatively coupled with the illumination module 110, the imaging module 130 and the image acquisition module 150. The electronic control module 160 can be implemented in hardware, firmware or software, or a combination thereof. In this manner, the electronic control module 160 is configured to cause the light source module 120 to sequentially illuminate the surface of the test object 105 with the multiple different spectral light distributions while the multi-element detector 155 correspondingly records the interference patterns and the color information. Various techniques for recording the interference patterns, when the test object surface is illuminated by one of the spectral distributions can be used, as known in the art.

In the example illustrated in FIG. 1, the electronic control module 160 includes a processor of interference patterns 170 and a processor of color data 180. In other implementations, the functions of the processor of interference patterns 170 and of the processor of color data 180 can be performed by a single, combined processor. The processor of interference patterns 170 is configured to determine information about shape of the surface of the test object 175, at least in part, from the interference patterns recorded using one of the multiple different spectral light distributions. The processor of color data 180 is configured to determine color texture of the surface of the object 185, at least in part, from the recorded images of the surface of the object respectively illuminated with two or more of the multiple spectral distributions. Aspects of using the processor of color data 180 to generate the color texture 185 of the test object surface 105 from color data acquired for the test surface is described below in connection with FIGS. 6A-6B. The electronic control module 160 further includes a combiner 190 configured to combine the surface topography 175 and the surface color texture 185 associated with the surface of the test object 105 into a 3D representation of shape and color texture 195 of the surface of the test object 105. A process of generating the 3D representation of shape and color texture 195 of the surface of the test object 105 based on surface shape data and surface color data is described below in connection with FIG. 3.

For a conventional interferometry system configured to perform surface metrology, it is possible in some cases to analyze the spectral distribution of broadband light reflected or scattered back by a test object surface and derive its visual color appearance by using the principle of Fourier transform spectroscopy. However, such an approach is most suitable with low numerical aperture of the imaging module. Indeed, for medium or high-numerical aperture optics the measured spectrum components can appear color-shifted because of the dependence of the interference signal frequency on both the wavelength of light but also the propagation direction of light beams in the test volume. In this manner, a smooth spherical surface measured with the conventional interferometry system would appear as increasingly reddish when looking at the measured spectral distribution as a function of the distance to the sphere apex. The processor of color data 180 operated in accordance with the disclosed technologies does not suffer from such limitations and is capable of delivering accurate color information of the test object surface 105 regardless of the imaging module 130's numerical aperture since the spectral content of the illumination is known for each frame of the multi-element detector 155.

In some implementations, the interferometry system 100 uses a first data acquisition sequence to capture topography information, followed by interleaved or sequential acquisition of color data.

For example, the color information is acquired by sequentially recording images of the test object surface while the illumination system switches through a set of spectral bands, for example a blue band (with wavelengths shorter than, say, 480 nm), a green band (with wavelengths in the vicinity of 530 nm) and a red band (with wavelengths longer than, say, 600 nm). More accurate color rendering is possible using more than three spectral bands while a minimum of two bands is used in accordance with the disclosed technologies. A subtractive approach is also possible where the interferometry system 100 collects color data for example with a broadband white-light spectrum and narrower green and red spectra. For instance, the topography and color information are acquired simultaneously via switching of the light source module 120 between the different spectral bands at the detector frame rate or an integral fraction thereof. In this case, a complete data acquisition can consist in recording a sequence of successive illumination patterns where, within one pattern, a first camera frame is recorded with the spectral band for collecting topography data, followed by one frame illuminated with red light, followed by frames illuminated with green, respectively blue light. This sequence is repeated while the interferometry system 100 collects all the shape and color data, for example by performing a scan of a measurement volume of the test object 105. More details of this technique of acquiring surface shape data and surface color data are described below in connection with FIG. 4.

As another example, the interferometry system 100 collects surface topography information by scanning the measurement volume. For example, the test object surface 105 can be positioned relative to the imaging module on a stage. An actuator of the interferometry system (not illustrated) is configured to shift the stage to positions corresponding to multiple optical path length differences between the test and reference images, each of the optical path length differences forming an associated interference pattern from among the multiple interference patterns. The interference patterns also can be used by the processor of interference patterns 170 to determine an optimum scan range 177. The optimum scan range 177 is distance along an optical axis of the imaging module 130 where the interferometry system 100 should collect, within the measurement volume, color information, such that the color information is collected when points of the object surface are within the depth of focus of the imaging module 130. This provides a color image that is in focus at all object locations even when the depth-of-focus is smaller than the total range of object heights. More details of this technique of acquiring surface shape data and surface color data are described below in connection with FIG. 5. Optionally in this case, the disclosed technologies can correct for chromatic variations of the location of best focus.

In addition, the interferometric system 100 further is configured to substantially reduce contrast of the color interference patterns created by the illumination module 110 and the imaging module 130 in the final color image recorded by the multi-element detector 155, as if a non-interferometric optical instrument had been used to collect color data. More details of this technique of reducing the contrast of the color interference patterns are described below in connection with FIG. 6.

Additionally, the interferometer system 100 can be configured such that only non-specularly reflected light (e.g., diffusely scattered light) reaches the multi-element detector 155 when collecting the color information. In some implementations described below in connection with FIG. 10 internal apertures can be switched in the illumination module 110 (e.g., aperture 125) and imaging module 130 (e.g., another aperture complementary to 125 that is placed in the imaging module 130, not shown in FIG. 1) during acquisition of the color data (this is described in more detail below in connection with FIG. 10). In other implementations described below in connection with FIG. 11, the second light source sub-module 126 of the light source module 120 is arranged to provide illumination light 128 to the test object surface 105 during acquisition of the color data, such that only diffusely scattered light 124' is captured by the imaging module 130.

Various implementations of the light source module 120 are described next. In general, multiple light sources included in the light source module 120 of the interferometry system 100 provide illumination light (or simply light) having a first spectrum for metrology, and as well as one or more additional light sources provide spectra for collecting color information.

Figure 2:
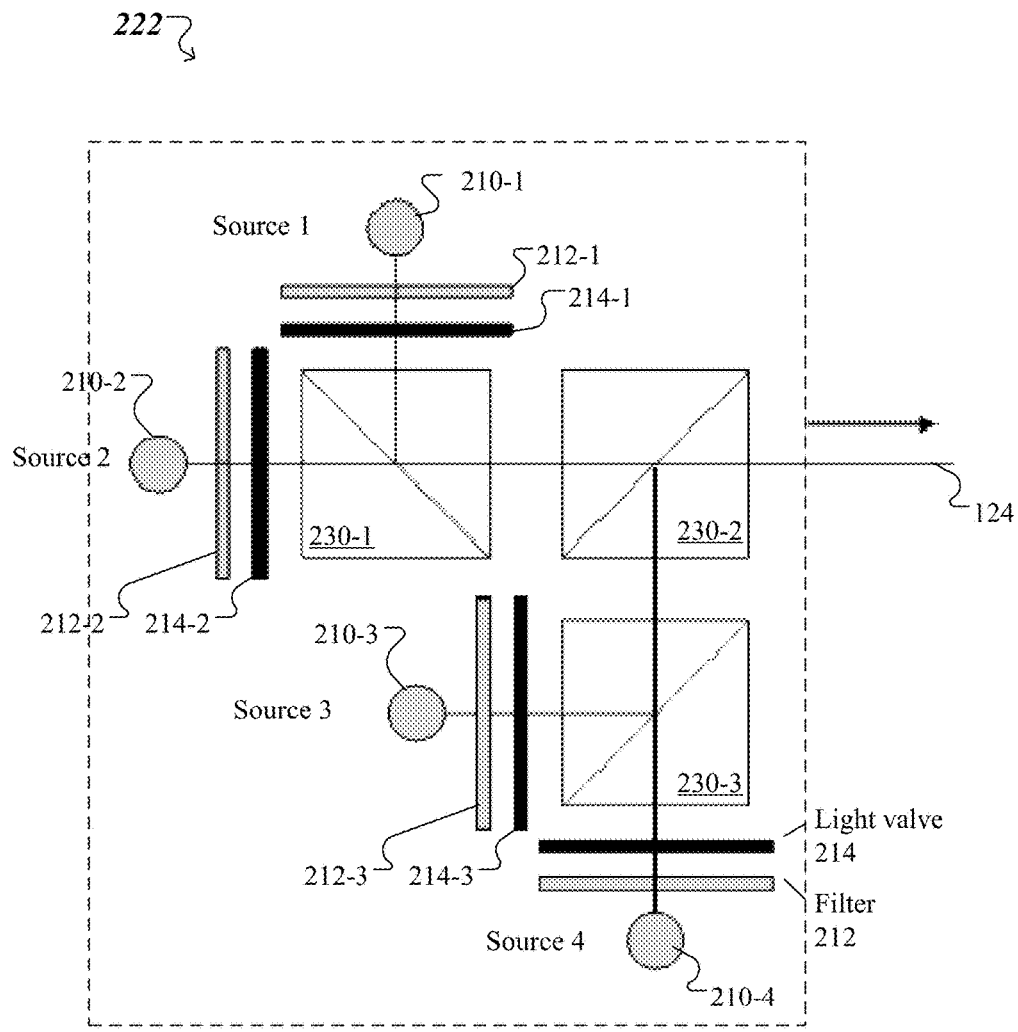
FIG. 2 is schematic diagram of an example of a light source used by the interferometry system from FIG. 1.

FIG. 2 is schematic diagram of an example of a light source module 222 that can be used in conjunction with the interferometry system 100 described above in connection with FIG. 1. The light source module 222 can sequentially produce spectral distributions of interest. Beam-splitting elements 230-$i$, where i=1, 2, . . . , fast-switching light valves 214-$j$, spectral filters 212-$j$, and switchable and/or non-switchable light sources 210-$j$, where j=1, 2, . . . , are used in conjunction to allow the sequential generation of the two or more source spectral distributions for metrology data collection and for color data collection. Various modulations sequences of the j channels (or j legs) of the light source module 222 are described below in connection with FIGS. 4 and 5.

The beam-splitting elements 230-$i$ can be dichroic filters, thin-film based beam-splitters (polarizing or non-polarizing), or diffraction gratings, for instance. The fast-switching light valves 214-$j$ can be diaphragms and mechanical shutters, spatial light modulators (micro-mirrors, LCD, LCOS), or acousto-optic or electro-optic modulators, for instance. The spectral filters 212-$j$ can be thin film interference filters, or absorption filters, for instance. In some implementations, the light sources 210-$j$ are fast-switching light sources, such as light emitting diodes (LEDs); laser diodes, fiber lasers; or thermal lamps. In some implementations, the light sources 210-$j$ are arc, discharge, fluorescent lamps; gas lasers, super-continuum lasers; plasma emitters; or black body emitters.

In the example of a light source module 222 illustrated in FIG. 2, outputs of four different source elements 210-j, where j=1-4 are combined by beam-splitting cubes 230-i, where i=1-3. Each source channel (or leg) of the light source module 222 can include additional filtering elements 212-j and light valves 214-j. In an example configuration for a low-coherence interferometric surface profiler, the source elements are four LEDs. In this case light valves 214-j may not be used as the LEDs 210-j can be switched on or off effectively instantaneously (when comparing to typical camera exposure duration). In some implementations, a first LED (210-1, for example an LED using a phosphor) produces the broadband light used for metrology, while a red, a green and a blue LED (e.g., 210-2, 210-3 and 210-4, respectively) are used to provide the light for color imaging. In other implementations, the metrology spectrum can be generated by a laser diode 210-1 if high temporal coherence is needed. Filters may not be used in this case. In some other implementations, if broader color illumination channels are used, broadband LEDs 210-j using phosphor emission are combined with filters 212-j to generate the desired spectral distributions.

As another example of a light source module 222, only three illumination color channels are chosen such that one of them also acts as the metrology source. In some implementations, a combination of the outputs of more than one color channel is used to synthesize the desired metrology channel. This provides the additional ability of tailoring the metrology spectrum for a particular application, for example by broadening or narrowing the spectral distribution or by changing the relative intensity of different spectral sub-domains. In this case the addition of the color imaging capability also enhances the metrology capability of the interferometry system 100, for instance. In other implementations, the source spectrum used for metrology is wide enough (extending sufficiently far in the blue and red regions of the visual range of wavelengths) that only two additional narrower color channels are used.

As yet another example of a light source module 222, the combination of a broadband metrology spectrum with a single complementary color channel can be sufficient to reconstruct color information over a subset of hues for some applications.

Figure 3:
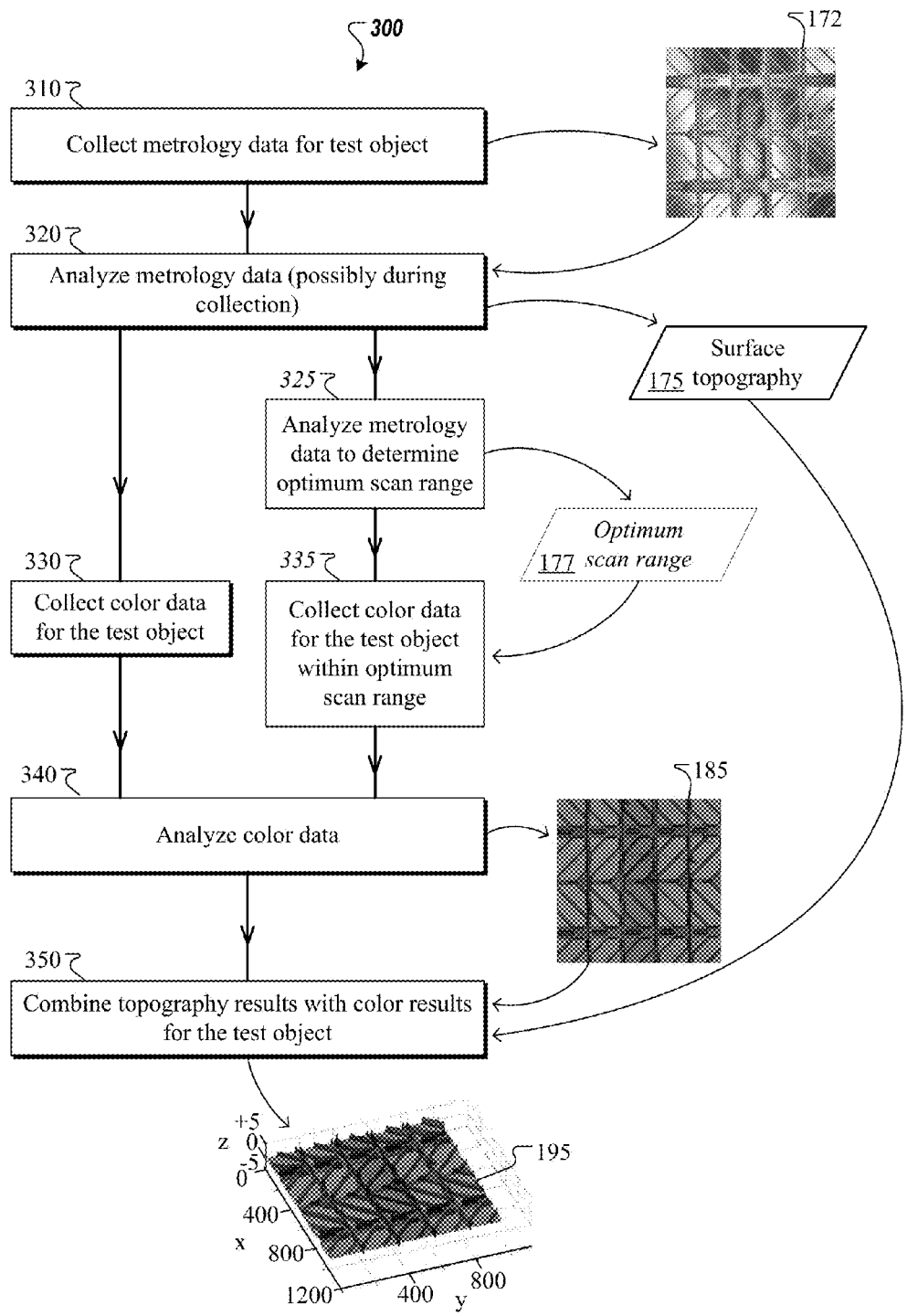
FIG. 3 shows an example of a process used to obtain profile and color information for a test surface.

Various techniques for data collection and analysis are now described in conjunction with interferometry system 100. For instance, FIG. 3 shows an example of a process 300 used to obtain profile and color information for a test object surface.

At 310, metrology data for a test object is collected. Here, the multi-element detector records interference patterns 172 formed when the test object surface is illuminated with light having one spectral distribution for each of multiple different distances between the reference object surface and the test object surface. Alternatively, the multi-element detector records interference patterns formed when the test object surface is illuminated with multiple spectral distributions, as in a so-called wavelength-scanning techniques where, for example, the emission wavelength of a laser diode is tuned over a pre-determined range to acquire metrology data. In the example implementation shown in FIG. 3, the interference pattern 172 represents metrology data recorded, for a matrix of RGB filters used in liquid crystal displays, with test light and reference light that originate from a white light source.

At 320, the collected metrology data is analyzed. In some implementations, the analysis of the metrology data is performed during the collection thereof. A result of the analysis of the metrology data is a surface topology 175 associated with the test object.

Optionally, at 325, the metrology data can be further analyzed to determine an optimum scan range 177 within which to collect color data. The optimum scan range is found as a range of distances between the imaging module 130 and the test object surface for which at least a portion of the test object surface is within a depth of focus of the imaging module 130.

At 330, color data for the test object is collected. In some implementations, the color data collection, at 330, is concurrent (interleaved) with the metrology data collection, at 310, as described below in connection with FIG. 4. In this case, the multi-element detector alternatively records, at 310, an interference pattern formed when the test object surface is illuminated with light having one spectral distribution, and, at 330, images of the test object surface when the latter is respectively illuminated with light having different spectral distributions, for each of multiple different distances between the imaging module and the test object surface.

Figure 5:
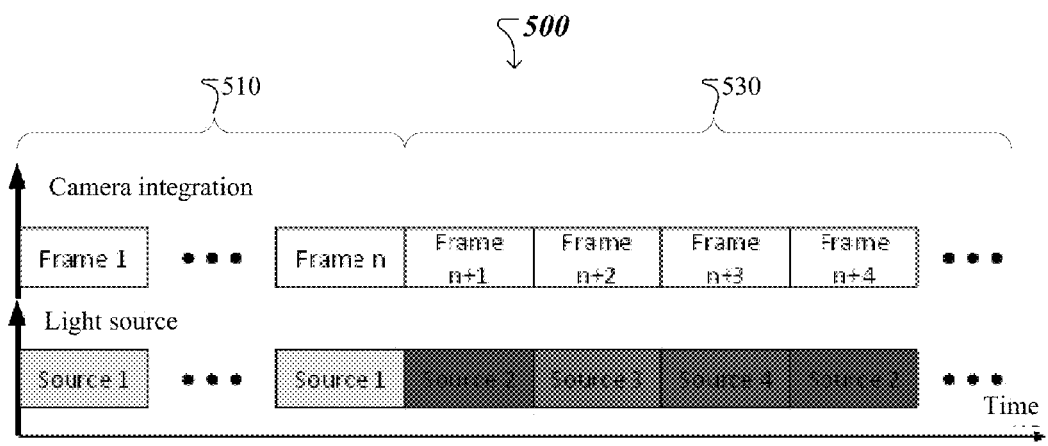
FIG. 5 shows aspects of another technique of acquiring metrology data and color data used by the process from FIG. 3.

In some implementations, the color data collection, at 330, is sequential with the metrology data collection, at 310, as described below in connection with FIG. 5. For example, the metrology source is activated and metrology data collected. Once this is complete, the electronic control module 160 of the interferometry system 100 switches to the color sources one by one and collects the relevant color information. In this case, the multi-element detector records two or more images of the test object surface when the test object surface is respectively illuminated with light having two or more different spectral distributions, for each of multiple different distances between the imaging module 130 and the test object surface.

Alternatively, at 335, color data for the test object is collected only within the optimum scan range 177 determined at 325. In this case, the multi-element detector records two or more images of the test object surface when the test object surface is respectively illuminated with light having two or more different spectral distributions, for each of multiple different distances between the imaging module 130 and the test object surface, such that the different distances only are within the optimum range 177. The stages 325 and 335 of the process 300 can be used to (i) minimize the duration of a complete (topography+color) measurement, or (ii) maximize the quality of the collected data, or (iii) both, because the interferometry system can derive preliminary information about the object surface before collecting the color data. For instance, for an interferometry system that is a low-coherence interferometer that scans a measurement volume, knowledge of the location of the test object surface in the scanned volume as a result of the metrology scan can be used to limit the extent of the scan used to collect color information to a subset of the volume where the object resides. This subset volume is bound by the optimum scan range 177 determined at 325. Moreover, the knowledge of the surface location provides the information for collecting, at 335, the color data when various points on the object are within the depth-of-focus of the imaging system. The measurement duration is consequently kept at a minimum and the color data are acquired with the best possible optical resolution.

At 340, color data collected at either 330 or 335 is analyzed. In some implementations, the analysis of the color data is performed during the collection thereof. A result of the analysis of the color data is a surface color texture 185 associated with the test object. Various data processing algorithms can be used to extract color information from the color data.

In some implementations, a true color image is generated by assigning the average intensities measured at the camera (or a combination of such intensities) to red, green and blue bitmap components, then displayed on a computer display or printed. In some implementations, corrections to the raw camera data are first applied using calibration information such as camera dark level, camera linearity response, illumination uniformity over the field of view, contribution from other optical components in the interferometry system (for example from the reference light 124"), etc. Additional processing steps include corrections for the white-balance of the color image in order to provide an image of the test object surface that matches the visual impression of an observer looking directly at the test object.

Note that color images of the surface of the test object 105 are not necessarily in focus for every location of the surface within a field of view of the imaging module 130 of the interferometry system 100, for instance. Consequently, although a color image, obtained at 340, has meaningful true colors, it does not necessarily capture all the high spatial frequency features of color or reflectivity variations that may normally be resolved with the imaging module 130. To obtain the color texture 185 of the test object surface 105, color information is selected that corresponds to the position of best focus for every location on the test object surface 105, even if a vertical range of the test object surface 105 exceeds the depth of focus of the imaging module 130. As a result, the high frequency variations of color and/or reflectivity across the test object surface 105 are resolved as well as possible given the optics of the imaging module 130 used.

In some implementations, additional processing is applied to the color data in order to remove any modulation of the image due to the presence of interference fringes, since these will a priori be present in the color data (unless the reference leg is blocked during acquisition, as described below). Interferometric surface profilers, e.g., the interferometry system 100 described above in connection with FIG. 1, are generally configured such that metrology data are acquired, at 310, in a form that can be modeled as the sum of an interference signal with a background signal. Processing of the metrology data, at 320, separates one from the other. A similar procedure can be used, at 340, to remove the interference content from the color data and only preserve the background information that will be used for creating the color image. That corresponds to the mean signal intensity in the case of phase-shifting acquisition. In the example implementation shown in FIG. 3, the result of the color data analysis is the color texture 185 of the same portion of the surface of the matrix of RGB filters for which the metrology data 172 was recorded.

At 350, the surface topography 175 and the surface color texture 185 are combined to generate a 3D representation of shape and color texture 195 of the test object 105. In the example implementation shown in FIG. 3, a true color 3D graph 195 represents the surface of the matrix of RGB filters and is generated as a combination of the surface topography 175 (obtained based on the metrology data 172) and the surface color texture 185.

Figure 4:
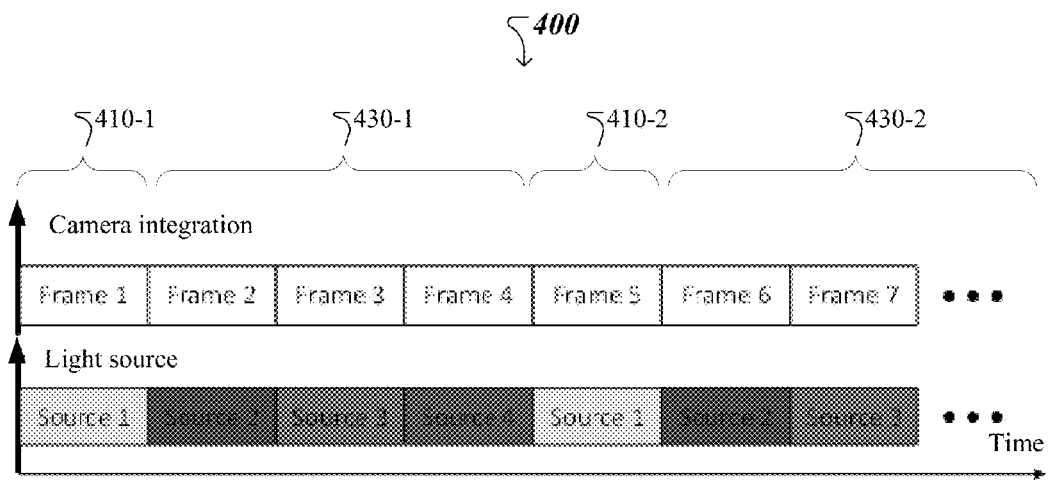
FIG. 4 shows aspects of a technique of acquiring metrology data and color data used by the process from FIG. 3.

As described above in connection with FIGS. 1 and 3, data collection can be optimum when source switching is interleaved, for some interferometry systems. FIG. 4 shows light source and multi-element detector timing 400 for interleaved metrology and color data collection. In this example, each frame of the multi-element detector is recorded with a different active light source. Light source 1 illuminates the test object surface for collecting metrology data during a first time interval 410-1. Light sources 2, 3 and 4 are not being used to illuminate the test object surface during the first time interval 410-1. During a time interval 430-1 which succeeds the first time interval 410-1, the light sources 2, 3 and 4 consecutively illuminate the test object surface for collecting color data. The light source 1 is not being used to illuminate the test object surface during the time interval 430-1. During a time interval 410-2 which succeeds the time interval 430-1, the light source 1 again illuminates the test object surface for collecting additional metrology data. The light sources 2, 3 and 4 are not being used to illuminate the test object surface during the time interval 410-2. During a time interval 430-2 which succeeds the time interval 410-2, the light sources 2, 3 and 4 again consecutively illuminate the test object surface for collecting additional color data. The light source 1 is not being used to illuminate the test object surface during the time interval 430-2. The light source and multi-element detector timing 400 for interleaved metrology and color data acquisition can be applied until sufficient metrology and color data has been collected.

For some other interferometry systems, measurement throughput can be optimized when the metrology data collection is performed separately from the color data collection. FIG. 5 shows light source and multi-element detector timing 500 for separate metrology and color data collection. For example, the collection of metrology data can span n frames over a first time interval 510, where n is the number of samples for measuring interferogram phase with a phase-shifting algorithm. In this case, the following frames n+1, n+2, . . . , represent, for example, red, green and blue data and are collected during a subsequent, second time interval 530. In some implementations, a single frame of, for example, red, green and blue data is sufficient for color imaging.

As another example, the collection of metrology data can be performed during the first time interval 510 while the imaging module of the interferometry system scans through a measurement volume, as is the case of low-coherence interferometers. In this case, a number of optimized scan speeds are used for metrology data collection. Subsequently, the collection of color data information during the second time interval 530 is performed at different scan speeds, for example much higher than the scan speeds used for metrology data collection, in order to minimize the overall measurement duration. Options for removing the interference content from the color data leverage a particular nature of the interferometry system.

A phase-shifter that is used for the topography measurement in some interferometry systems can be used differently when collecting color data. For instance, phase-shifter amplitude and modulation speed are adjusted, during time interval 530, such that the interference fringes modulate fast enough during camera integration that they average out entirely. This is accomplished, for example, by linearly phase-shifting a cavity of the interferometric objective 140 with an amplitude that is a multiple of the source wavelength within each camera frame n+1, n+2, . . . . Another option is to impart a periodic, for example sinusoidal, oscillation to the phase-shifter during camera integration, in order to wash out the fringes. This mechanism can be refined by adjusting the intensity of the light source 120 during the camera integration, synchronously with the phase-shifting device.

For low-coherence interferometry systems it is similarly possible to scan through the measurement volume at a speed which results in essentially complete wash out of the interference pattern for each color channel.

Some interferometry systems use imaging modules that provide limited depth-of-focus as a result of their high illumination or imaging numerical aperture. In such cases, it is not always possible to impart a large modulation of the cavity of the interferometric objective 140 to eliminate the interference phenomenon without also blurring the image, which is undesirable. In this case, the modulation speed of the phase-shifter (or scanner) is adjusted such that the interference signal variations from frame to frame correspond to well-defined band of frequencies, which can be digitally filtered out when processing a sequence of intensity measurements (e.g., as part of stage 340 of the process 300 described above in connection with FIG. 3.)

In some implementations, the interferometry system 100 can include a beam block that engages during the time intervals 430-1, 430-2, . . . , or time interval 530 when color data is collected to prevent light from traveling to the reference leg of the interferometer (e.g., to block the reference light 124") and thus prevent the formation of interference fringes in the color data.

Figure 6A:
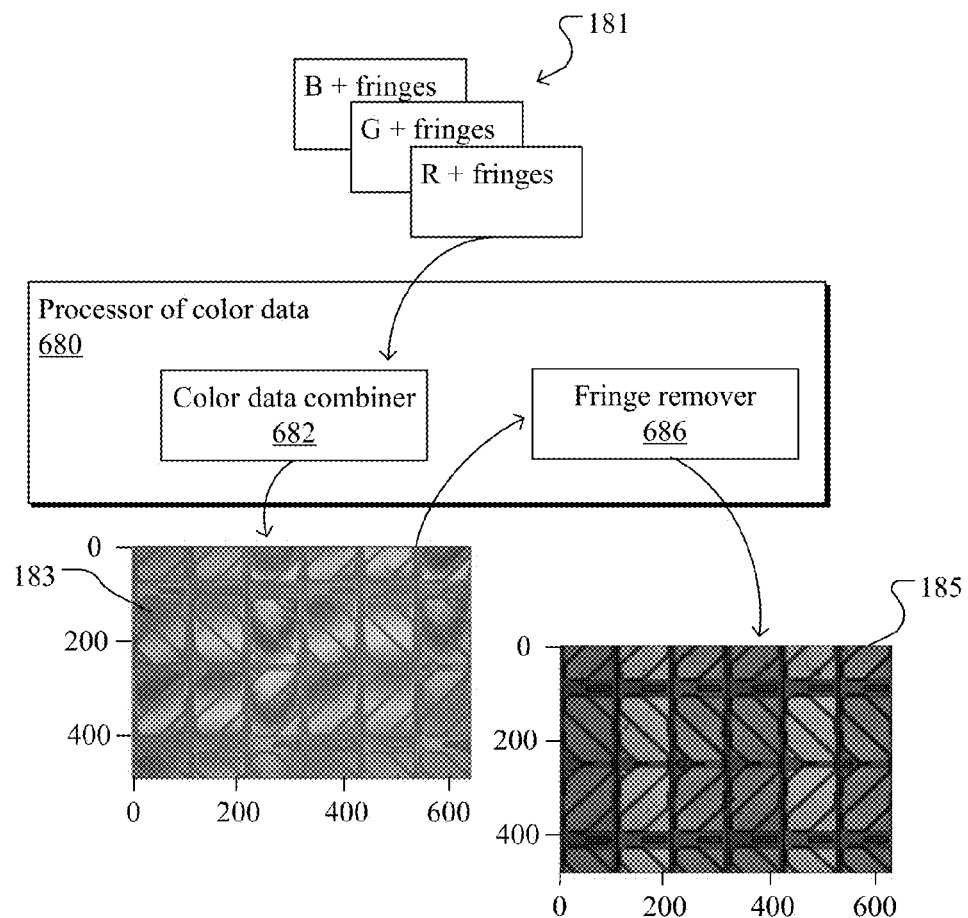
FIGS. 6A-6B show examples of transformations undergone by color data during a stage of the process from FIG. 3.
Figure 6B:
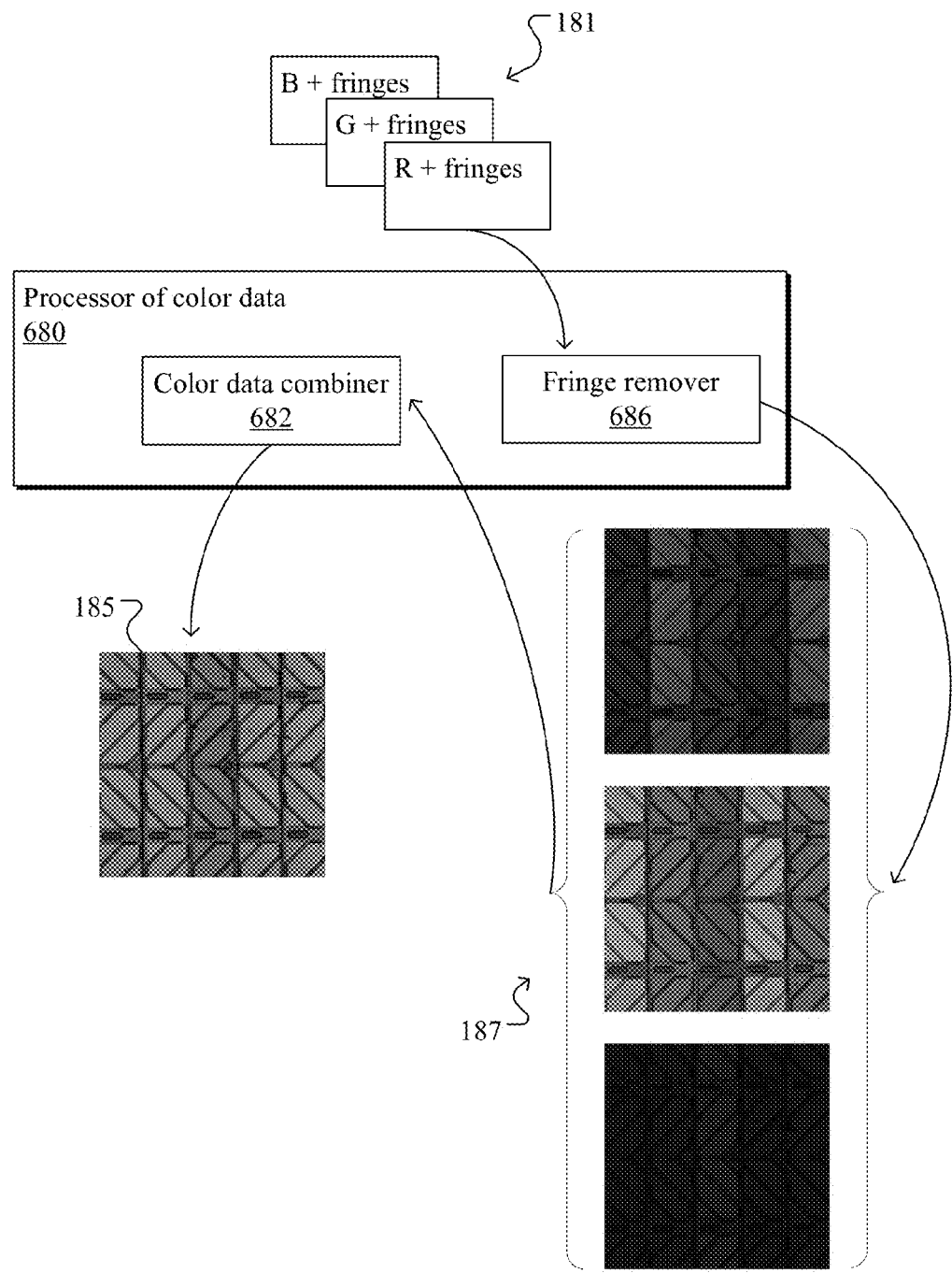

FIGS. 6A and 6B show aspects of using a processor of color data 680 to generate color texture 185 of a test surface from color data 181 acquired for the test surface. For instance, the processor of color data 680 can correspond to the processor of color data 180 described above in connection with FIG. 1. Moreover, the color data 181 can be images of the test surface acquired by the interferometry system 100 with red (R), green (G) and blue (B) illumination, such that at least some of the acquired R, G, B images include interference data. The interference data represents interference modulation or fringes. In the example illustrated in FIGS. 6A and 6B, color images 181 of a matrix of RGB filters used in liquid crystal displays are captured according to the disclosed technologies using a low-coherence interferometry system 100, equipped with an illumination module 122/222 including red, green and blue light sources (e.g., filtered LEDs) in addition to a broadband LED used for metrology.

The processor of color data 680 includes a color data combiner 682 and a fringe remover 686. In a configuration of the processor of color data 680 illustrated in FIG. 6A, the color data combiner 682 can be engaged first to combine the recorded R, G, B images 181 to obtain an intermediary color image 183. In this case, the intermediary color image 183 may contain residual fringes. The fringe remover 686 is engaged next to remove (or at least substantially reduce) such residual fringes of the obtained intermediary color image 183 in order to generate the surface color texture 185, e.g., in accordance with stage 340 of the process 300. In another configuration of the processor of color data 680 illustrated in FIG. 6B, the fringe remover 686 can be engaged first to remove (or at least substantially reduce) the interference modulation from the recorded R, G, B images 181 to obtain intermediary R, G, B images 187 that are fringe-less. The color data combiner 682 is engaged next to combine the obtained intermediary fringe-less R, G, B images 187 in order to generate the surface color texture 185.

Figure 7:
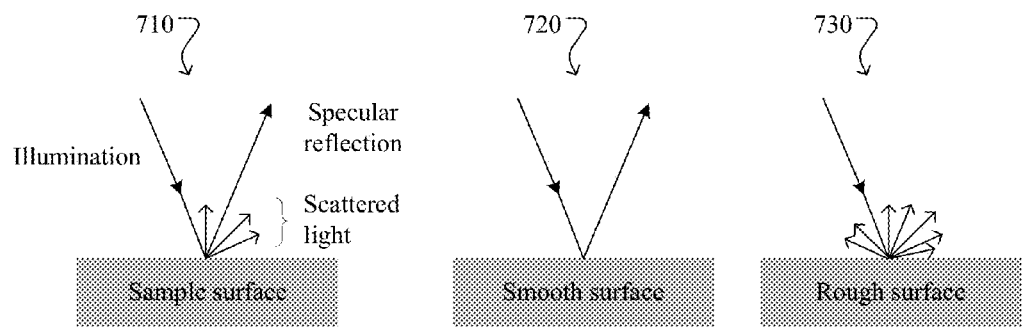
FIG. 7 shows diagrams of various types of light reflection from a surface of an object.
Figure 8:
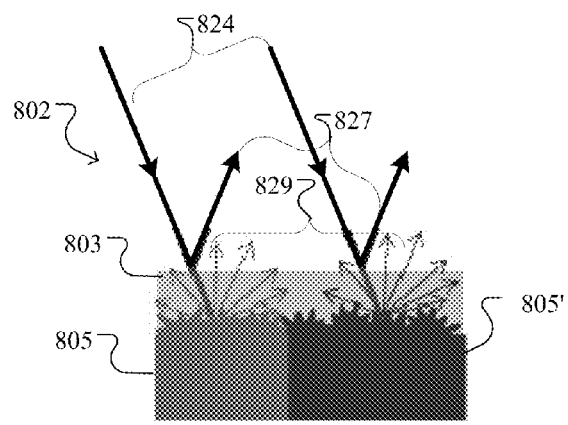
FIG. 8 shows a diagram of light reflection from a surface of an object which contains different color pigments.

Implementations of the interferometry system 100 with additional control of specular and non-specular (e.g., diffusely scattered) light are described below. A test object surface reflects light in a specular direction (symmetrical to the illumination direction with respect to the local surface normal) and scatters light in random directions. FIG. 7 illustrates, in panel 710, how a test object surface can both reflect light along the so-called specular direction and scatter light in random directions. An opaque surface that is optically smooth (its surface roughness is much smaller than the wavelength of light) reflects most of the incoming light along the specular direction, as shown in panel 720. Conversely, a surface that is optically rough will scatter light in most directions, as shown in panel 730. The amount of light scattered in any specific direction is much smaller in the latter case. These principles are important in the context of color imaging as many colorful surfaces both reflect and scatter light. It is the case that, especially for manufactured colored objects (e.g. a glossy printed page), the much stronger specular reflection carry little color information as the reflection occurs at an interface with a transparent material layer. This case is described in connection with FIG. 8, in which incident light 824 reflects off a test object surface 802. The test object surface 802 includes a transparent, smooth overcoat 803 and embedded pigments 805, 805' having different colors. A portion 827 of the reflected light along a specular direction has both specular and scattered light contributions. Another portion 829 of the reflected light along a non-specular direction has only scattered light contributions. The portion 829 of light scattered by the pigments in the non-specular direction carries most of the color information. However, the scattered portion of light 829 is often not as intense as the specularly reflected light 827. An optical instrument that illuminates and collects light within the same solid angle, e.g., 827, will thus in general collect a strong color-neutral specular signal and a weak color signal. This results in low-contrast color information in the final "true-color" image. The aspects of the technology described below in connection with FIGS. 10 and 11 provide means to predominantly collect scattered light, e.g., 829, in order to improve color saturation.

Figure 9:
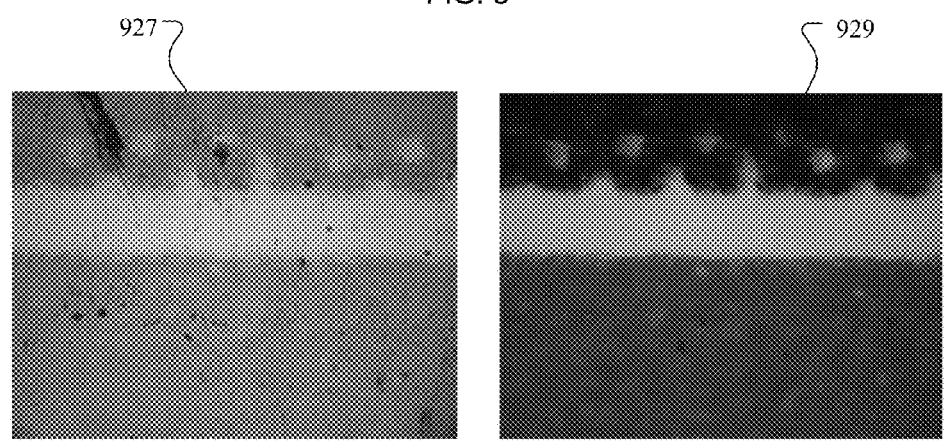
FIG. 9 shows two images recorded using specularly reflected light and diffusely reflected light, respectively.

As an illustration of the phenomenon described above in connection with FIGS. 7 and 8, FIG. 9 shows two images of the same test object surface, e.g., a surface of consumer product packaging. Image 927 is acquired when the test object surface is illuminated and observed through a conventional microscope. The specular light, e.g., 827, collected by the instrument carries little color information, resulting in washed out colors of the image 927. Conversely, image 929 is acquired when the same test object surface is illuminated using an illumination configuration for which reflected specular light cannot enter the microscope objective (a configuration known as "darkfield" imaging). In this manner, the image 929 is formed from diffusely scattered light, e.g., 829, and, hence, the colors of the image 929 are saturated and match the visual impression of a human observer looking at the test object surface.

Figure 10:
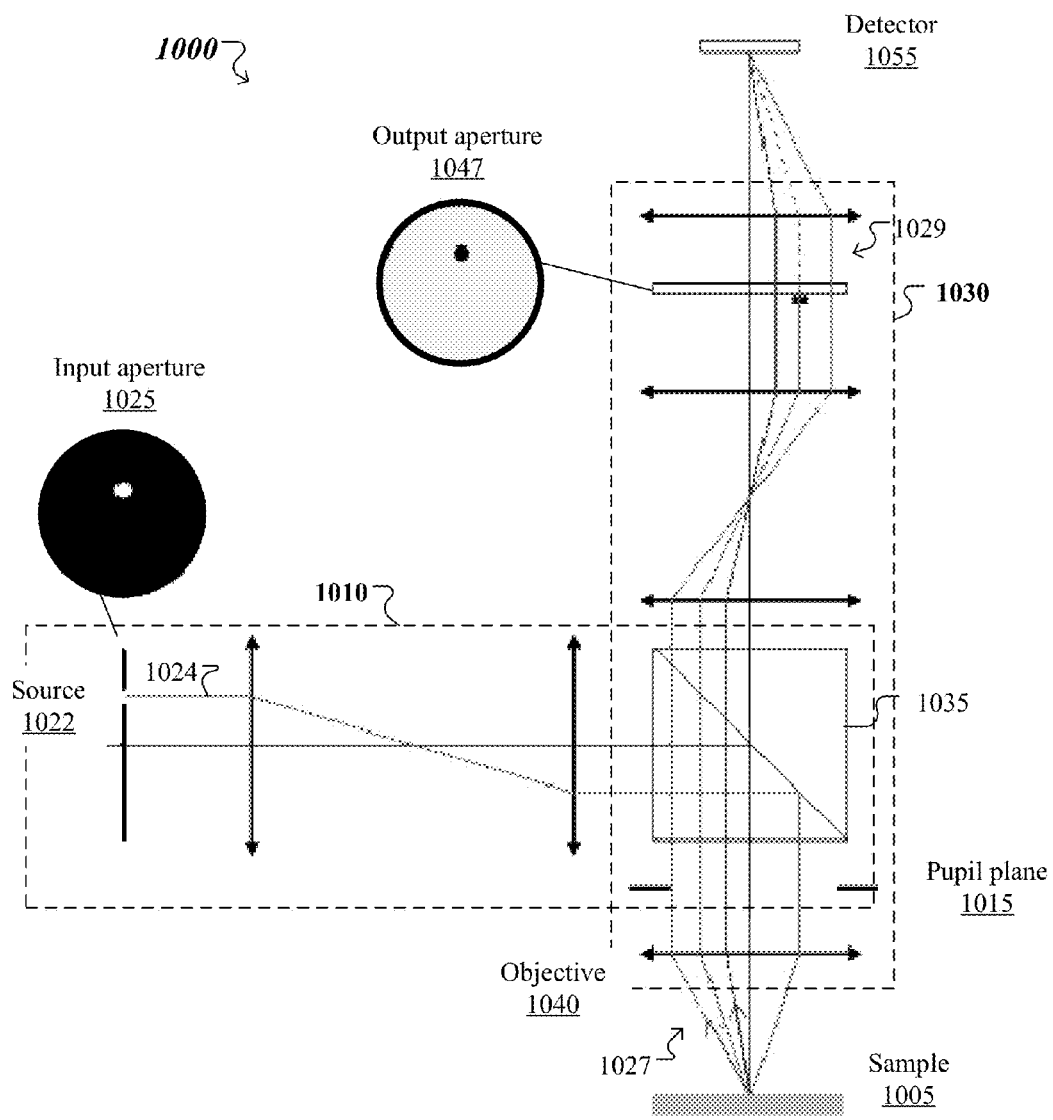
FIG. 10 shows components of the interferometry system from FIG. 1 used to acquire color information for a test surface from diffusely reflected light.
Figure 11:
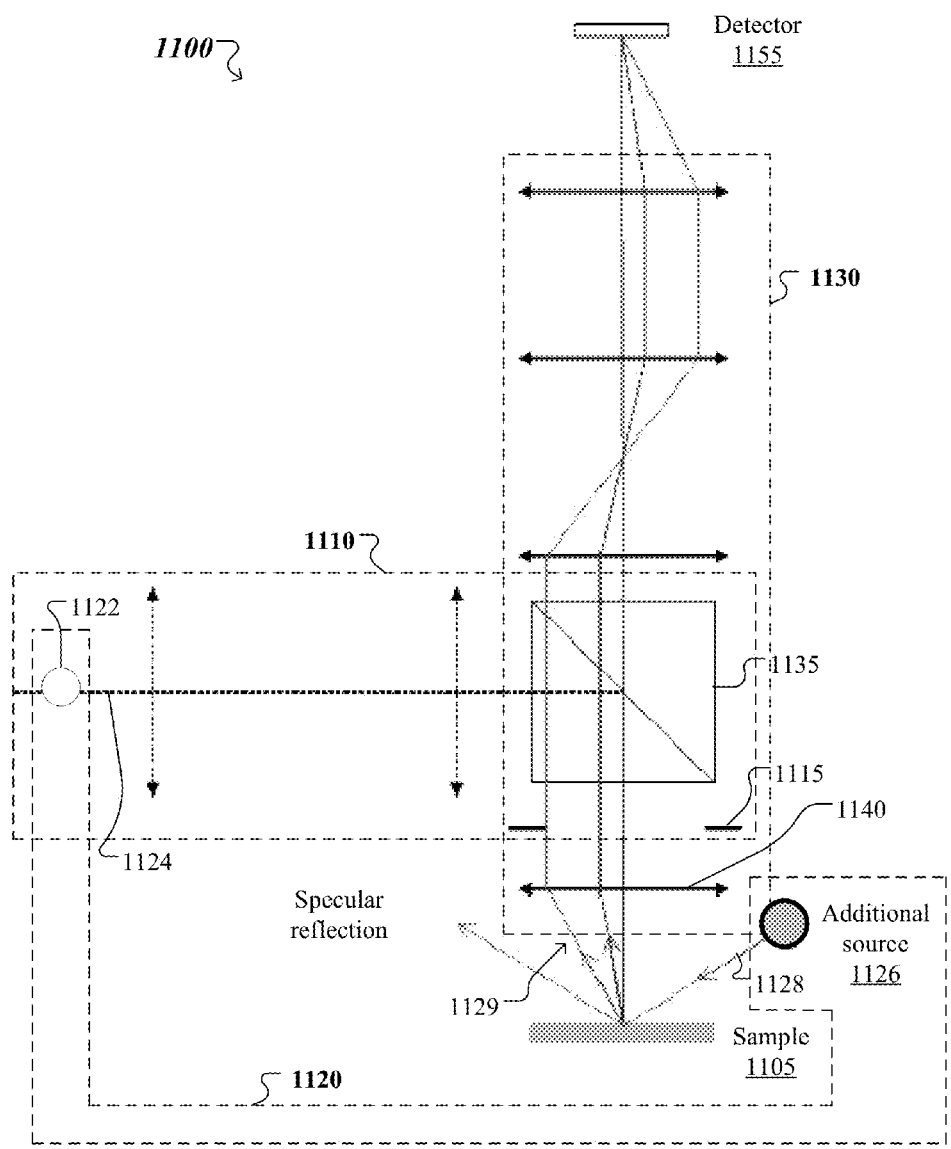
FIG. 11 shows other components of the interferometry system from FIG. 1 used to acquire color information for a test surface from diffusely reflected light.

FIG. 10 shows components of an interferometry system 1000 used to acquire color information for a test object surface 1005 from diffusely reflected light 1029. The interferometry system 1000 includes an illumination module 1010, an imaging module 1030 and a multi-element detector 1055. The illumination module 1010 includes a light source module 1022 configured to generate multiple different spectral light distributions to be used to illuminate the test object surface 1055 during acquisitions of metrology data (e.g., interference patterns used to determine surface topography) and color data. The spectral light distributions generated by the light source module 1022 are sequentially modulated as described above in connection with FIGS. 4 and/or 5. In some implementations, the light source module 1022 can be the light source module 222 described above in connection with FIG. 2. Illumination light 1024 output by the light source module propagates to the test object surface 1005 through an input aperture 1025, a beam splitter 1035, a field stop 1015 and an interference objective 1040. The illumination light 1024 reflects from the test object surface 1005 as reflected light 1027. The reflected light 1027 contains specular and non-specular components. The reflected light 1027 propagates to the multi-element detector 1055 through the interference objective 1040, the beam splitter 1035 and an output aperture 1047.

In this example, the input aperture 1025 and the output aperture 1047 form a complementary set. The input aperture 1025 and the output aperture 1047 can be physical beam blocks (e.g. a mechanical iris, slit, ring) or programmable devices (e.g. spatial light modulators). In some implementations, the input aperture 1025 is arranged and configured to define an effective source point or source sub-region that covers only a fraction of a pupil plane 1015 of the interferometry system 1000. The complementary output aperture 1047 (e.g. a transparent plate carrying a localized absorbing material or another spatial light modulator) is aligned such that it intercepts the specular component of the light 1027 that is reflected in the specular direction by the test object surface 1005. A portion of light 1029 that is not blocked by the output aperture 1047 represents light scattered in non-specular directions by the test object surface and forms an image of the test object surface 1005 onto the multi-element detector 1055.

Other implementations can use darkfield optics (e.g. darkfield microscope objectives) that provide separate optical paths for illumination and imaging. FIG. 11 shows components of the interferometry system 1100 used to acquire color information for a test object surface 1105 from diffusely reflected light 1129. The interferometry system 1100 includes an illumination module 1110, an imaging module 1130 and a multi-element detector 1055. The illumination module 1110 includes a light source module 1120. The light source module 1120 contains a first light source sub-module 1122 configured to provide illumination light 1124 used during acquisition of metrology data (e.g., interference patterns used to determine surface topography), and an additional light source sub-module 1126 configured to provide illumination light 1128 used during acquisition of color data. The sub-modules 1122 and 1126 are sequentially modulated as described above in connection with FIGS. 4 and/or 5.

In this example, the first light source sub-module 1122 can be a conventional illumination source used for metrology data collection. The illumination light 1124 propagates to the test object surface 1105 through a beam splitter 1135, an aperture stop or entrance pupil 1115 and an interference objective 1140. A portion of the illumination light 1124 reflects from the test object surface 1105 as test light and another portion of the illumination light 1124 reflects from surfaces of a reference cavity of the interferometer objective 1040 as reference light (as illustrated in FIG. 1.) Then, the test and reference lights propagate to the multi-element detector 1155, through the interferometer objective 1140, the field stop 1115 and the beam splitter 1135, to form the above-noted interference patterns associated with the test object surface 1105.

Further in this example, the additional light source sub-module 1126 can include an LED ring light made of different color LEDs uniformly distributed along a circle (e.g., placed around the interference objective 1040) to provide the illumination light 1128 from a wide range of directions at the test object surface 1105. The illumination light 1128 is provided by the additional light source sub-module 1126 at an incidence angle such that a specular portion of the reflected light misses the interferometer objective 1140 and the pupil of the imaging module 1130. In this manner, only a non-specular portion 1129 of the reflected light is captured by the interference objective 1140 and the pupil 1115. The non-specular portion 1129 of the reflected light propagates to the multi-element detector 1155, through the beam splitter 1135 of the imaging module 1130, to provide color information associated with the test object surface 1105.

In some embodiments, a color acquisition illumination sequence (without a scan of the measurement volume) also can be used to generate a stream of color images of a surface of a test object. The stream of color images can be displayed in real time on a display module of the interferometry system 100, for instance. The stream of colored images can be used by a user of the interferometry system 100, or by an automated shape/color recognition module of the interferometry system 100 to navigate to a measurement site on the surface of the test object 105. A 3D representation of shape and color texture 195 for the surface of the test object 105 may be generated at the measurement site, as described above in this specification in connection with FIGS. 1 and/or 3.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An interferometry system of comprising:
   an illumination module configured to generate multiple different spectral light distributions;
   a multi-element detector;
   an imaging module configured to
   image, on the multi-element detector, a surface of a test object using test light, and
   combine the test light, on the multi-element detector, with reference light to form an interference pattern, the test and reference light being derived from the illumination module; and
   an electronic control module communicatively coupled with at least the illumination module and the multi-element detector, wherein, during operation, the electronic control module
   causes the illumination module to sequentially illuminate the surface of the test object with the multiple different spectral light distributions while the multi-element detector correspondingly records interference patterns and images of the surface of the test object,
   determines information about (i) a shape of the surface of the test object, at least in part, from the interference patterns recorded for one or more of the multiple different spectral light distributions, and (ii) a color of the surface of the test object, at least in part, from images recorded for two or more of the multiple spectral distributions, wherein the information about the color of the surface of the test object is determined by the electronic control module as a true-color image, such that each pixel of the true-color image comprises an average of corresponding pixels of the images of the surface of the test object respectively illuminated with the two or more of the multiple spectral distributions, wherein fringes of interference patterns in the images of the surface of the test object illuminated with respective two or more of the multiple spectral distributions are removed by the electronic control module prior to generation of the average associated with the true-color image, and
   generates a representation of the shape and the color of the surface of the test object from the determined information.

2. The system of claim 1, wherein
   the one or more of the multiple spectral light distributions used to form the recorded interference patterns is a first spectral light distribution, and
   the respective two or more of the multiple spectral distributions used for the recorded images are the first spectral light distribution and a second spectral light distribution.

3. The system of claim 1, wherein
   the one or more of the multiple spectral light distributions used to form the recorded interference patterns is a first spectral light distribution, and
   the respective two or more of the multiple spectral distributions used for the recorded images are a second spectral light distribution and a third spectral light distribution.

4. The system of claim 1, wherein
   the one or more of the multiple spectral light distributions used to form the recorded interference patterns is a broadband light distribution, and
   the respective two or more of the multiple spectral distributions used for the recorded images are two or more from among red, green or blue light distributions.

5. The system of claim 4, wherein the illumination module comprises
   a white light source that emits the broadband light distribution,
   two or more of a red filter, a green filter or a blue filter, and
   the red, green, and blue filters are configured to filter the broadband light distribution provided by the white light source to respectively obtain the red, green and blue light distributions.

6. The system of claim 4, wherein the illumination module comprises
   a white light source that emits the broadband light distribution, and
   two or more of a red light source, a green light source or a blue light source that respectively emit the red, green and blue light distributions.

7. The system of claim 1, wherein the electronic control module switches, at a frame rate of the multi-element detector or an integral fraction thereof, the illumination module between the one or more of the multiple spectral light distributions used to form the interference patterns and the two or more of the multiple spectral light distributions used for recording the images.

8. The system of claim 1, wherein the electronic control module
   maintains the one or more of the multiple spectral light distributions when the interference patterns are recorded by the multi-element detector, and
   switches, at a frame rate of the multi-element detector or an integral fraction thereof, the two or more of the multiple spectral light distributions when the images used for color information are recorded by the multi-element detector.

9. The system of claim 1, further comprising
   a stage positioned to vary an optical path length difference between the test light and the reference light; and
   an actuator communicatively coupled with the electronic control module and configured to shift the stage to positions corresponding to multiple optical path length differences between the test and reference lights, each of the optical path length differences forming an associated interference pattern from among the interference patterns.

10. The system of claim 9, wherein the stage is arranged to position the test object surface relative to the imaging module.

11. The system of claim 10, wherein the electronic control module positions the test object surface within a depth of focus of the imaging module, based on the determined information about the shape of the surface of the test object, such that the images are recorded in focus by the multi-element detector.

12. The system of claim 1, comprising:
    a wavelength tunable light source configured to emit test light of two or more wavelengths; and
    a second light source configured to emit illumination light having a spectral light distribution different from the two or more wavelengths of the test light,
    wherein the respective two or more of the multiple spectral distributions used for the recorded images are one of the two or more wavelengths of the light emitted by the wavelength tunable source, and the spectral light distribution of the illumination light emitted by the second light source,
wherein the imaging module defines a non-zero optical path length difference between the test light and the reference light, and
wherein the electronic control module shifts between the two or more wavelengths of the test light to introduce two or more phase differences between the test and reference lights, each of the phase differences forming an associated interference pattern from among the interference patterns.

13. The system of claim 1, wherein the imaging module comprises an interferometer module that is bypassed during acquisition of the images of the surface of the test object respectively illuminated with two or more of the multiple spectral distributions, such that the images are free of interference patterns.

14. The system of claim 1, further comprising
a display device,
wherein the electronic control module, prior to recording the interference patterns of the surface of the test object,
causes the illumination module to sequentially illuminate the surface of the test object with the two or more spectral light distributions while the multi-element detector correspondingly records images of the surface of the test object,
determines information about the color of the surface of the test object, at least in part, from the images recorded for the two or more of the multiple spectral distributions,
renders, in real time on the display device based on the determined information about the color of the surface of the test object, a sequence of true color images of the surface of the test object, and
in response to said rendering of the sequence of true color images, receives a specification of a measurement site, located within the sequence of the true color images, at which the representation of the shape and the color of the surface of the test object is to be generated.

15. An interferometry system comprising:
an illumination module configured to generate multiple different spectral light distributions;
a multi-element detector;
an imaging module configured to
image, on the multi-element detector, a surface of a test object using test light, and
combine the test light, on the multi-element detector, with reference light to form an interference pattern, the test and reference light being derived from the illumination module, wherein the illumination module and the imaging module include respective beam stops with matching apertures configured and arranged to allow only non-specularly reflected light to reach the multi-element detector; and
an electronic control module communicatively coupled with at least the illumination module and the multi-element detector, wherein, during operation, the electronic control module
causes the illumination module to sequentially illuminate the surface of the test object with the multiple different spectral light distributions while the multi-element detector correspondingly records interference patterns and images of the surface of the test object, wherein the electronic control module disengages the beam stops when the multi-element detector records the interference patterns, and engages the beam stops when the multi-element detector obtains the images of the surface of the test object respectively illuminated with two or more of the multiple spectral distributions,
determines information about (i) a shape of the surface of the test object, at least in part, from the interference patterns recorded for one or more of the multiple different spectral light distributions, and (ii) a color of the surface of the test object, at least in part, from images recorded for two or more of the multiple spectral distributions, and
generates a representation of the shape and the color of the surface of the test object from the determined information.

16. The system of claim 15, wherein the electronic control module switches, at a frame rate of the multi-element detector or an integral fraction thereof, the illumination module between the one or more of the multiple spectral light distributions used to form the interference patterns and the two or more of the multiple spectral light distributions used for recording the images.

17. The system of claim 15, wherein the electronic control module
maintains the one or more of the multiple spectral light distributions when the interference patterns are recorded by the multi-element detector, and
switches, at a frame rate of the multi-element detector or an integral fraction thereof, the two or more of the multiple spectral light distributions when the images used for color information are recorded by the multi-element detector.

18. An interferometry system comprising:
an illumination module configured to generate multiple different spectral light distributions;
a multi-element detector;
an imaging module configured to
image, on the multi-element detector, a surface of a test object using test light, and
combine the test light, on the multi-element detector, with reference light to form an interference pattern, the test and reference light being derived from the illumination module; and
an electronic control module communicatively coupled with at least the illumination module and the multi-element detector, wherein, during operation, the electronic control module
causes the illumination module to sequentially illuminate the surface of the test object with the multiple different spectral light distributions while the multi-element detector correspondingly records interference patterns and images of the surface of the test object, wherein the illumination module is configured and arranged to provide the respective two or more of the multiple spectral distributions used for the recorded images at angles of incidence with respect to the surface of the test object, such that only non-specularly reflected light enters the imaging module
determines information about (i) a shape of the surface of the test object, at least in part, from the interference patterns recorded for one or more of the multiple different spectral light distributions, and (ii) a color of the surface of the test object, at least in part, from images recorded for two or more of the multiple spectral distributions, and generates a representation of the shape and the color of the surface of the test object from the determined information.

19. The system of claim 18, wherein the electronic control module switches, at a frame rate of the multi-element detector or an integral fraction thereof, the illumination module between the one or more of the multiple spectral light distributions used to form the interference patterns and the two or more of the multiple spectral light distributions used for recording the images.

20. The system of claim 18, wherein the electronic control module
maintains the one or more of the multiple spectral light distributions when the interference patterns are recorded by the multi-element detector, and
switches, at a frame rate of the multi-element detector or an integral fraction thereof, the two or more of the multiple spectral light distributions when the images used for color information are recorded by the multi-element detector.

21. An interferometry method comprising:
imaging, by imaging optics on a multi-element detector, a surface of a test object using test light;
combining, by the imaging optics on the multi-element detector, the test light with reference light to form an interference pattern, the test and reference light being derived from a light source that emits multiple different spectral light distributions;
sequentially illuminating the surface of the test object with the multiple different spectral light distributions while correspondingly recording, by the multi-element detector, interference patterns and images of the surface of the test object;
determining, by a controller module, information about (i) a shape of the surface of the test object, at least in part, from the interference patterns recorded for one or more of the multiple different spectral light distributions, and (ii) a color of the surface of the test object, at least in part, from images recorded for two or more of the multiple different spectral distributions, wherein the determining of the information about the color of the surface of the test object comprises
generating a true-color image, such that each pixel of the true-color image comprises an average of corresponding pixels of the images of the surface of the test object respectively illuminated with the two or more of the multiple different spectral distributions, and
removing fringes of the interference patterns in the images of the surface of the test object respectively illuminated with the two or more of the multiple different spectral distributions prior to the generating of the average associated with the true-color image; and
generating, by the controller module, a representation of the shape and the color of the surface of the test object from the determined information.

22. The interferometry method of claim 21, wherein
one of the multiple spectral light distributions used to form the recorded interference patterns is a first spectral light distribution, and
the respective two or more of the multiple spectral distributions used for the recorded images are the first spectral light distribution and a second spectral light distribution.

23. The interferometry method of claim 21, wherein
one of the multiple spectral light distributions used to form the recorded interference patterns is a first spectral light distribution, and
the respective two or more of the multiple spectral distributions used for the recorded images are a second spectral light distribution and a third spectral light distribution.

24. The interferometry method of claim 23, further comprising switching, at a frame rate of the multi-element detector or an integral fraction thereof, the light source between the one of the multiple spectral light distributions used to form the interference patterns and the two or more of the multiple spectral light distributions used for recording the images.

25. The interferometry method of claim 23, further comprising
maintaining the one of the multiple spectral light distributions when the interference patterns are recorded by the multi-element detector; and
switching, at a frame rate of the multi-element detector or an integral fraction thereof, the two or more of the multiple spectral light distributions when the images used for color information are recorded by the multi-element detector.

26. The interferometry method of claim 23, further comprising:
varying an optical path length difference between the test light and the reference light by positioning a stage; and
shifting, by an actuator, the stage to positions corresponding to multiple optical path length differences between the test and reference images, each of the optical path length differences forming an associated interference pattern.

27. The interferometry method of claim 26, further comprising positioning the test object surface relative to the imaging optics by arranging the stage.

28. The interferometry method of claim 27, further comprising positioning, by the control module, the test object surface within a depth of focus of the imaging optics, based on the determined information about the shape of the surface of the test object, such that the images are recorded in focus by the multi-element detector.

29. The interferometry method of claim 21, further comprising bypassing a reference leg of the imaging optics during acquisition of the images of the surface of the test object respectively illuminated with two or more of the multiple spectral distributions, such that the images are free of interference patterns.

30. An interferometry method comprising;
imaging, by imaging optics on a multi-element detector, a surface of a test object using test light;
combining, by the imaging optics on the multi-element detector, the test light with reference light to form an interference pattern, the test and reference light being derived from a light source that emits multiple different spectral light distributions;
sequentially illuminating the surface of the test object with the multiple different spectral light distributions while correspondingly recording, by the multi-element detector, interference patterns and images of the surface of the test object;
engaging, by a controller module, matching beam stops respectively disposed in the light source and the imaging optics to allow only non-specularly reflected light to reach the multi-element detector, when the multi-element detector obtains the images of the surface of the test object respectively illuminated with two or more of the multiple spectral distributions;

disengaging, by the controller module, the matching beam stops when the multi-element detector records the interference patterns;

determining, by the controller module, information about (i) a shape of the surface of the test object, at least in part, from the interference patterns recorded for one or more of the multiple different spectral light distributions, and (ii) a color of the surface of the test object, at least in part, from images recorded for two or more of the multiple spectral distributions; and generating, by the controller module, a representation of the shape and the color of the surface of the test object from the determined information.

31. The interferometry method of claim 30, further comprising switching, at a frame rate of the multi-element detector or an integral fraction thereof, the light source between the one of the multiple spectral light distributions used to form the interference patterns and the two or more of the multiple spectral light distributions used for recording the images.

32. The interferometry method of claim 30, further comprising maintaining the one of the multiple spectral light distributions when the interference patterns are recorded by the multi-element detector; and switching, at a frame rate of the multi-element detector or an integral fraction thereof, the two or more of the multiple spectral light distributions when the images used for color information are recorded by the multi-element detector.

33. An interferometry method comprising:

imaging, by imaging optics on a multi-element detector, a surface of a test object using test light;

combining, by the imaging optics on the multi-element detector, the test light with reference light to form an interference pattern, the test and reference light being derived from a light source that emits multiple different spectral light distributions;

providing, by the light source, the two or more of the multiple spectral distributions, used to respectively form the images, at angles of incidence with respect to the surface of the test object, such that only non-specularly reflected light enters the imaging optics;

sequentially illuminating the surface of the test object with the multiple different spectral light distributions while correspondingly recording, by the multi-element detector, interference patterns and images of the surface of the test object;

determining, by a controller module, information about (i) a shape of the surface of the test object, at least in part, from the interference patterns recorded for one or more of the multiple different spectral light distributions, and (ii) a color of the surface of the test object, at least in part, from images recorded for two or more of the multiple spectral distributions; and generating, by the controller module, a representation of the shape and the color of the surface of the test object from the determined information.

34. The interferometry method of claim 33, further comprising switching, at a frame rate of the multi-element detector or an integral fraction thereof, the light source between the one of the multiple spectral light distributions used to form the interference patterns and the two or more of the multiple spectral light distributions used for recording the images.

35. The interferometry method of claim 33, further comprising maintaining the one of the multiple spectral light distributions when the interference patterns are recorded by the multi-element detector; and switching, at a frame rate of the multi-element detector or an integral fraction thereof, the two or more of the multiple spectral light distributions when the images used for color information are recorded by the multi-element detector.

* * * * *

UNITED STATES PATENT AND TRADEMARK OFFICE
CERTIFICATE OF CORRECTION

PATENT NO. : 9,541,381 B2  
APPLICATION NO. : 14/174352  
DATED : January 10, 2017  
INVENTOR(S) : Xavier Colonna de Lega It is certified that error appears in the above-identified patent and that said Letters Patent is hereby corrected as shown below:

In the Claims

<u>Column 19</u>
Line 2, in Claim 1, after "system" delete "of"

<u>Column 24</u>
Line 50, in Claim 30, delete "comprising;" and insert -- comprising: --

Signed and Sealed this
Fourteenth Day of March, 2017

Michelle K. Lee
*Director of the United States Patent and Trademark Office*